June 4, 1929.  W. M. HARKS  1,715,833
POSITIVE MEASURE VISIBLE PUMP
Filed May 29, 1924   2 Sheets-Sheet 2
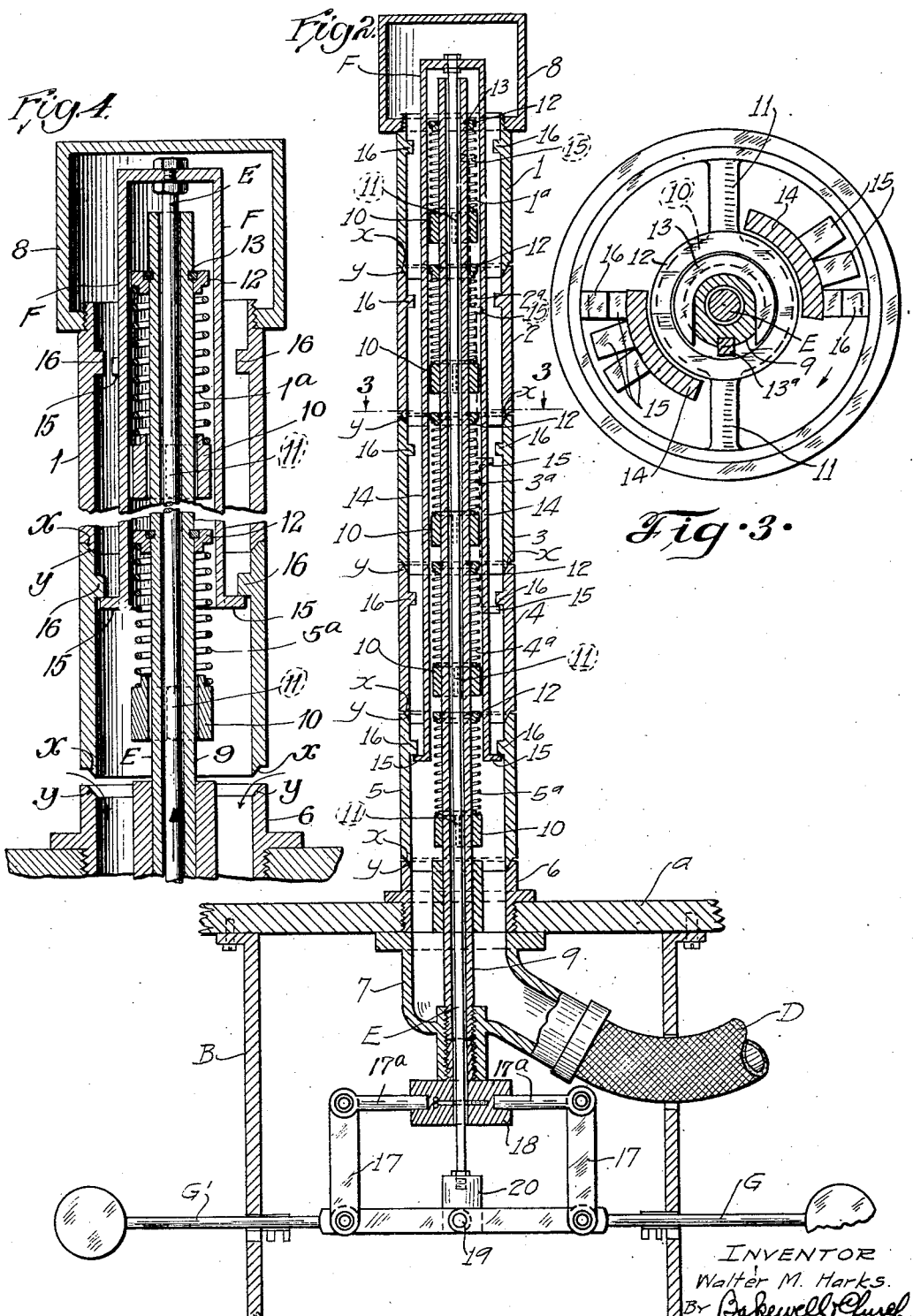

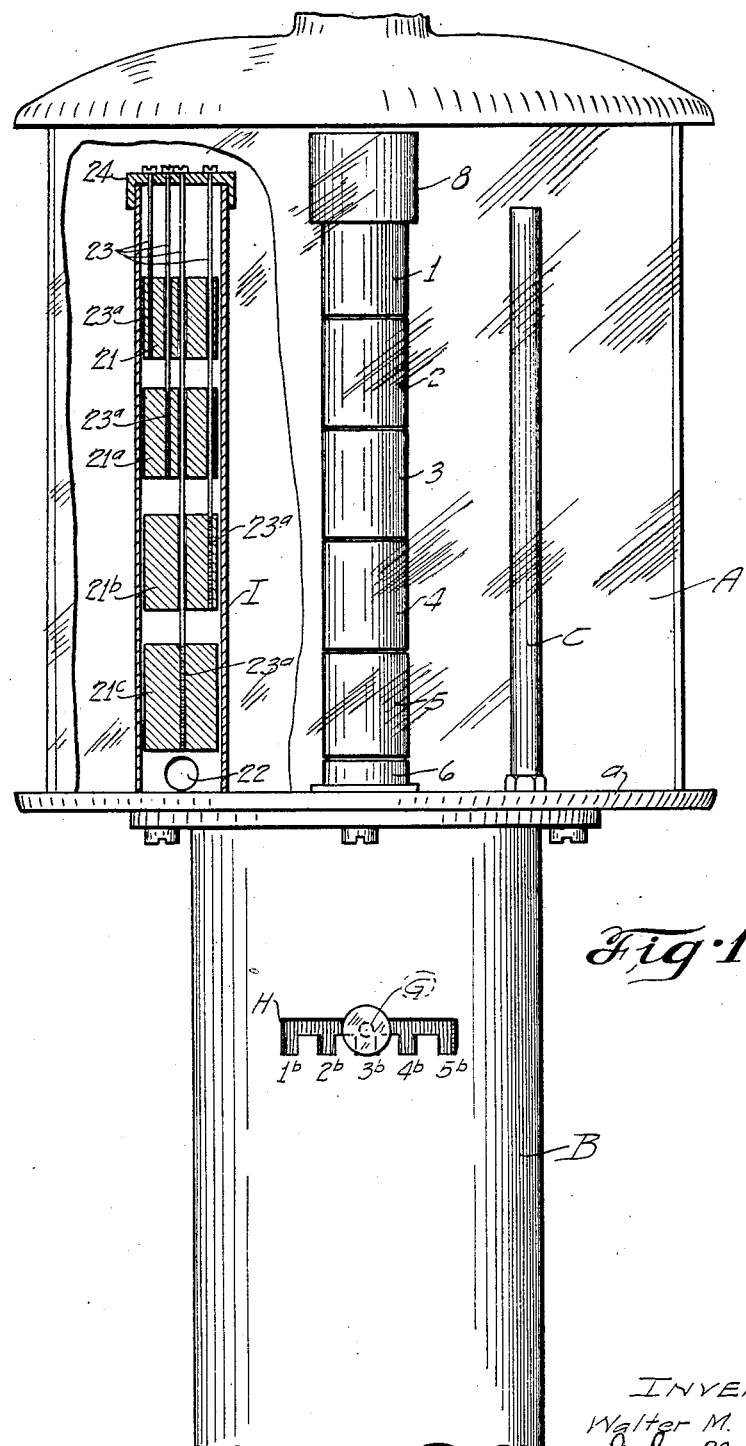

Patented June 4, 1929.

1,715,833

UNITED STATES PATENT OFFICE.

WALTER M. HARKS, OF MADISON, WISCONSIN, ASSIGNOR TO ROSS E. RISSER, OF BONHAM, TEXAS.

POSITIVE-MEASURE VISIBLE PUMP.

Application filed May 29, 1924. Serial No. 716,664.

This invention relates to measuring pumps of the kind that are used for dispensing liquids, and particularly to visible measuring pumps of the positive type such as are used at gasolene filling stations for dispensing gasolene to users of power-operated vehicles.

One object of my invention is to provide a positive measure pump that is easy to maintain in operative condition, due to the fact that it is not equipped with a stuffing box through which the measured liquid is liable to escape if the stuffing box is not absolutely tight.

Another object is to provide a positive measure liquid dispensing pump which is of such design that the operator in charge of the pump only has to operate a single controlling device to measure the liquid and effect the discharge of same from the liquid container of the pump.

And still another object of my invention is to provide a positive measure visible pump that is equipped with a novel means for correcting errors of measurement, such, for example, as errors caused by wear of the cooperating parts of the pump, or by the settling of the pump. Other objects and desirable features of my invention will be hereinafter pointed out.

I have herein illustrated my invention embodied in a visible measuring pump of the type now used quite generally for dispensing gasolene, but I wish it to be understood that my invention is applicable to various other types and kinds of pumps that are used for measuring liquids.

Figure 1 of the drawings is an elevational view of a positive measure visible pump constructed in accordance with my invention, with parts broken away.

Figure 2 is a vertical sectional view of the measuring valves and the operating mechanism for said valves.

Figure 3 is an enlarged horizontal sectional view, taken on the line 3—3 of Figure 2, looking downwardly or in the direction indicated by the arrows in Figure 2; and Figure 4 is an enlarged sectional view, taken at right angles to Figure 2.

Referring to the drawings which illustrate the preferred form of my invention, A designates a liquid container, preferably a closed, transparent, cylindrical member arranged in an elevated position on an upright B and provided with an intake (not shown) through which the liquid to be dispensed is introduced into said container, the container A being equipped with a conventional overflow pipe C through which liquid in excess of a certain quantity escapes back to the source of supply during the operation of filling said container. If the pump is designed to measure liquid in amounts of five gallons and less, the overflow pipe C will be so constructed and arranged in the container A that the liquid introduced into the container in excess of five gallons during the operation of filling the container will escape back to the source of supply through the overflow pipe C, and thus cause the level of the liquid in the container to stand at the upper end of the overflow pipe C when the container A holds the maximum quantity of liquid which the pump is capable of measuring at one operation.

The escape of the liquid from the container A to the hose D through which the liquid is delivered to the purchaser is governed by a plurality of measuring valves 1, 2, 3, 4 and 5 arranged in the container A in such a way that when valve 1 is opened or rendered operative, a certain definite quantity of liquid, say, one gallon, will escape from the container; when the valve 2 is opened two gallons will escape; when the valve 3 is opened three gallons will escape; when the valve 4 is opened four gallons of liquid will escape and when the valve 5 is opened the maximum quantity of liquid capable of being measured by the pump will escape from the container A. Preferably, the measuring valves above referred to consist of sleeves or open-ended, tubular members arranged at the center of the container A in superimposed relation and separated from each other by horizontally-disposed joints located at different levels or at different distances from the bottom $a$ of the container A, each of said valves being provided at its lower end with a tapered, ground portion $x$ that is adapted to fit snugly in a tapered, ground seat $y$ in the upper end portion of the measuring valve arranged directly underneath same. As shown in Figure 2, the tapered portion $x$ at the lower end of the bottom valve 5 fits in a tapered seat in a collar 6 on the bottom of the liquid container. When said measuring valves are closed, as shown in Figure 2, they form a hollow column at the center of the liquid container A that constitutes a discharge passageway through which the liquid escapes from the container into the filling hose D, which is connected at its inner end to an elbow-shaped member 7 secured to the bottom $a$ of the liquid container at a point in alignment with the collar 6 on which the bottom valve 5 seats. The upper end of the column formed by the measuring valves is closed by a cap 8 connected to the top valve 1, so as to prevent the liquid from escaping through the discharge passageway formed by the measuring valves during the operation of filling the liquid container A.

Various means can be used for holding the measuring valves seated, but I prefer to provide each of said valves with an actuating spring so as to insure the submerged valves remaining tightly seated when one of the valves above the submerged valves is in its open position. In the pump herein shown a vertically-disposed guide tube 9 projects upwardly through the discharge passageway formed by the tubular measuring valves, said guide tube 9 being connected at its lower end to the elbow-shaped member 7 on the bottom of the liquid container A and having its upper end terminating inside of the cap 8 connected to the top valve 1. Coiled expansion springs $1^a$, $2^a$, $3^a$, $4^a$ and $5^a$ that are associated with the measuring valves are arranged on the tube 9 between spring abutments connected to the measuring valves and spring abutments on the tube 9 so as to exert downward pressure on the measuring valves and thus hold said valves seated. Each of the measuring valves is provided with a spider-like portion arranged on the interior of same and composed of an annular spring abutment 10 arranged at the center of the valve and radially-projecting arms 11 connected at their inner ends to said annular spring abutment 10 and connected at their outer ends to the side wall of the valve. The spring abutments on the tube 9 are formed by annular members or washers 12 that surround said tube and which are connected to same by substantially U-shaped devices 13 of the kind shown in Figure 3 that are arranged horizontally on the tube 9 in horizontally-disposed grooves in the exterior of said tube. In assembling the valves the bottom valve 5 is slipped over the tube 9 and moved downwardly into engagement with its co-operating seat formed in the collar 6 on the bottom $a$ of the liquid container, and the spring $5^a$ that co-operates with said valve is then slipped over the tube 9 and moved downwardly until said spring engages the annular spring abutment 10 of said valve which surrounds the tube 9, the valve being so arranged that a slot in the abutment 10 is in alignment with a slot in the exterior of the tube 9, so as to permit a locking key $13^a$, hereinafter described to be introduced into said slots. One of the annular-shaped spring abutment members 12 is then slipped over the tube 9 and moved downwardly into engagement with the upper end of the spring, after which the spring is compressed longitudinally sufficiently to permit the U-shaped device 13 that co-operates with said spring abutment member to be inserted in the groove provided for same in the tube 9, thus causing the spring $5^a$ that is associated with the bottom valve 5 to be held under compression. Due to the fact that said spring is held under compression between a stationary spring abutment 12 arranged above the spring and a spring abutment 10 on the valve that is arranged at the lower end of the spring, said spring will force the valve downwardly into engagement with its seat. In arranging the abutment member 12 in position, said member is disposed so as to cause a slot in same to register with the slots in the tube 9 and abutment 10 that receive the locking key $13^a$. The other valves are assembled in the manner above described, and thereafter a locking key $13^a$ is forced downwardly through a longitudinally-disposed groove or slot in the exterior of the tube 9 and longitudinally-aligned slots in the spring abutment members 10 on the measuring valves, as shown in Figure 3, so as to prevent said measuring valves from rotating, and through similar longitudinally aligned slots in the abutment member 12, as it is necessary that said valves be maintained in a certain position in order to insure proper co-operation of same with the valve operating mechanism, as hereinafter described. A valve structure of the character described is inexpensive to manufacture and is not liable to get out of order when the pump is in use. Due to the fact that each measuring valve is provided with a tapered, ground portion that fits snugly in a ground, tapered seat, there is little liability of the liquid escaping from the container A through the joints between the measuring valves, but even if liquid should escape through the joints between the measuring valves, this would have no affect on the accuracy of the pump, due to the fact that any liquid which leaks through the joints between the measuring valves will collect in the filling hose D, and thus be served to the purchaser of the first gallon dispensed by the pump. In other words, if liquid should leak through the joints between the measuring valves, thus lowering the level of the liquid in the container A and causing less than one gallon to escape from said container when the top valve 1 is opened, the customer who receives said "short" gallon will also receive the escaped liquid that has collected in the filling hose D. Accordingly, in my improved pump leakage of liquid through the joints between the measuring valves has absolutely no affect on the accuracy of the pump and does not result in the purchaser of the first gallon receiving short measure.

The mechanism that I prefer to use for operating the measuring valves comprises an actuating member which the operator in charge of the pump first sets in a certain position, depending upon the number of gallons that are to be served to a customer, and then operates so as to open the valve that governs the discharge of the quantity of liquid that the customer desires. Said valve operating mechanism can be constructed in various ways without departing from the spirit of my invention, but I prefer to equip the pump with a valve operating mechanism that comprises a vertically-disposed valve operating rod E arranged in the tube 9, as shown in Figure 2, and rigidly connected at its upper end, above the upper end of the tube 9, to a yoke-shaped valve lifting member F that comprises two depending side pieces 14 that project downwardly between the spider-like portions of the measuring valves at points on the outside of the spring abutments 10 of said spider-like portions. Said side pieces 14 are provided with laterally-projecting lugs that are adapted to co-operate with inwardly-projecting lugs on the measuring valves, said co-operating lugs being so arranged that a slight rotary movement of the valve rod E into a certain position causes a pair of lugs on the valve lifting member F to be arranged underneath and in vertical alignment with a pair of lugs on the top valve 1; a slight rotary movement of the valve rod E into a different position causes an independent pair of lugs to be arranged beneath and in vertical alignment with a pair of lugs on the valve 2 and rotary movement of the valve rod E into three other positions causes independent pairs of lugs on the valve lifting member F to be brought into operative relationship with lugs on the valves 3, 4 and 5. After the valve rod E has been turned so as to arrange the valve lifting member F in operative relationship with a selected valve, said valve rod E is moved upwardly relatively to the guide tube 9 so as to cause the valve lifting member F to raise the selected valve, whereupon the liquid in the container will start to escape through the space between said selected valve and the measuring valve directly underneath same and will continue to escape until the level of the liquid drops to a point in horizontal alignment with the top edge of the valve arranged directly underneath the selected valve. Owing to the fact that the co-operating lugs on the valve lifting member F and on the various measuring valves are duplicates of each other, I have used the reference character 15 to designate all of the laterally-projecting lugs on the valve lifting member F and have used the reference character 16 to designate all of the inwardly-projecting, co-operating lugs on the measuring valves. While the pairs of laterally-projecting lugs 15 on the valve lifting member F are duplicates of each other, said pairs of lugs are not arranged in vertical alignment with each other, but are offset slightly, as shown in Figure 3, so that when the valve rod E is turned to cause a selected pair of lugs 15 to be arranged in operative relationship with the inwardly-projecting lugs 16 on a selected valve, none of the other lugs 15 on the valve lifting member will be in vertical alignment with the inwardly-projecting lugs 16 of the remaining valves. Each measuring valve is capable of being moved upwardly out of engagement with its co-operating seat in the upper end of the measuring valve directly underneath the same, but all of the measuring valves are securely held against rotary movement by the key 13$^a$ that extends longitudinally of the tube 9 through the spring abutments 10 of the measuring valves, as previously described.

Any suitable means can be used for turning the valve rod E and for moving said rod upwardly to open the valves, the means herein illustrated for this purpose consisting of an actuating member G pivotally mounted on a link 17 and having its inner end pivotally connected at 19 to a block 20 that is rigidly fastened to the lower end of the valve rod E, as shown in Figure 2. The link 17, just referred to, is suspended from a horizontally-disposed member 17$^a$ which is oscillatingly mounted on a stationary bearing piece 18 at the lower end of the elbow-shaped member 7 on the bottom of the liquid container, said member 17$^a$ being capable of a limited oscillating movement in a horizontal plane when the actuating member G is swung to the left or to the right. The particular construction of the member 17$^a$ and the bearing piece 18 is immaterial, but in the form of my invention herein illustrated the bearing piece 18 is rigidly connected to the part 7 and is provided with a horizontally-disposed, annular groove that receives the member 17$^a$, which member 17$^a$ is constructed in two halves so as to enable it to be combined easily with the bearing piece 18. Due to the fact that the inner end of the actuating member G is connected to the block 20, which, in turn, is rigidly connected to the valve rod E, it will be understood that sidewise movement of said actuating member, either to the right or to the left produces a change in the position of the lifting member F which is attached to the valve rod. The actuating member G co-operates with a stationary rack H, shown in Figure 1, that is provided with five notches designated 1$^b$, 2$^b$, 3$^b$, 4$^b$ and 5$^b$ which indicate the position in which the actuating member G must be set when it is desired to open a selected valve. Assuming that it is desired to dispense three gallons of liquid, the actuating member G is swung in a horizontal plane into alignment with the notch 3$^b$ of the rack H, thus causing the valve rod E to turn the valve lifting member F into such a position that one pair of lugs 15 on said valve lifting member are located directly underneath and in vertical alignment with the pair of lugs 16 on the valve 3. The operator then depresses the actuating member G so as to raise the valve rod E and the valve lifting member F, whereupon the valve 3 will be moved upwardly, and thus permit the liquid in the container A above the top edge of the valve 4 to escape through the filling hose D. After the level of the liquid has dropped to the upper edge of the valve 4 no more liquid can escape from the container A. It will thus be seen that the accuracy of my pump is not dependent on the operator in charge of the pump closing a valve when the level of the liquid in the container A drops to a point gauged by the eye of the operator, but, on the contrary, the escape of the liquid from the container A of my improved pump is cut off automatically when the level of the liquid drops to a point in horizontal alignment with a member in the liquid container over which the liquid must flow to escape from the container. Such a pump requires very little care to maintain it in operative condition, as it does not comprise a stuffing box through which liquid can escape from the container A, if the stuffing box is not absolutely tight, as in prior positive measure visible pumps; and another desirable feature of my pump is the ease with which it can be operated to increase the amount of liquid to be delivered to a customer in the event the customer changes his mind after giving his order. For example, if after the operator has opened the valve 2 to deliver two gallons of liquid to a customer, the customer asks for two more gallons, the operator merely has to move the valve actuating member G into alignment with the notch 4$^b$ of the rack H and depress said member so as to open the valve 4, whereupon two additional gallons of liquid will be served the customer through the filling hose D. In order that the valve rod E may be operated from either side of the pedestal or upright B on which the liquid container is mounted, an additional valve actuating member G' is connected to the block 20 on the lower end of the valve rod E, as shown in Figure 2.

In pumps of the type to which my invention relates it is usual to correct errors of measurement in the maximum quantity of liquid capable of being measured by the pump by raising or lowering the overflow pipe C, but in prior pumps no means was provided for correcting errors of measurement of quantities less than the maximum quantity controlled by the overflow pipe. In order to overcome this objectionable characteristic of conventional visible measuring pumps I have provided my improved pump with a means for correcting errors of measurement in the smallest quantity capable of being measured by the pump and errors of measurement in the other predetermined quantities between the minimum and maximum quantities. Said means consists of a vertically-disposed, tubular member I arranged inside of the liquid container A and provided with a number of vertically-adjustable displacement elements 21, 21$^a$, 21$^b$ and 21$^c$ that can be raised and lowered in the tubular member I, said member I being provided at its lower end with a port 22 that establishes communication between the interior of said member and the interior of the container A, thus permitting the liquid that is introduced into the container A to enter the tubular member I and rise and fall therein as the level of the liquid in the container A varies. The displacement elements just referred to are arranged in the tubular member I at such points that an error in the measurement of the quantity of liquid controlled by the valve 1 can be corrected by raising or lowering the displacement element 21; an error in the measurement of the quantity of liquid controlled by the valve 2 can be corrected by raising or lowering the displacement element 21$^a$; an error in the measurement of the quantity of liquid controlled by the valve 3 can be corrected by raising or lowering the displacement element 21$^b$ and an error in the measurement of the quantity of liquid controlled by the valve 4 can be corrected by changing the position of the displacement element 21$^c$. If, after the pump has been in use for sometime, it is found that the quantity of liquid that escapes from the container A when the valve 1 is opened is in excess of one gallon, due to wear on the co-operating parts of the pump or from other causes, this error can easily be corrected by raising the displacement element 21 so as to virtually cut down the volume of the zone of the container A bounded by the upper end of the overflow pipe C and the top edge of the valve 2. Thereafter, when the container A is filled with liquid, up to the top edge of the overflow pipe C, the maximum quantity of liquid which the pump is capable of measuring will be the same as before the adjustment of the displacement element 21, but the quantity of liquid that escapes from the container A when the valve 1 is opened will be less than before the displacement element 21 was adjusted, due to the fact that a greater portion of the displacement element 21 extends into the horizontal zone controlled by the valve 1, and consequently, displaces some of the liquid from said zone when the container A is being filled. Likewise, the adjustment of the other displacement elements displaces the liquid in the horizontal zones of the container A controlled by the valves 2, 3 and 4. It will, of course, be understood that the adjustments of the overflow pipe C and of the displacement elements 21 to 21$^c$, inclusive, are not made by the operator in charge of the pump, but instead, are made by a city official whose duty it is to inspect the pump at frequent intervals and test it to see if it is accurately measuring the liquid which the owner of the pump is dispensing to the public. Various means can be used for adjusting the displacement elements, such, for example, as rods 23 rotatably mounted in a cap 24 at the upper end of the tubular member I and provided with screw-threaded portions 23ª that project through internally-screw-threaded holes in the displacement elements, as shown in Figure 1, the rotary movement of any one of said rods causing the displacement element with which it co-operates to be raised and lowered in the member I, depending upon the direction in which said rod is turned.

While I have herein illustrated the preferred form of my invention as being equipped with tubular measuring valves arranged in superimposed relation, I wish it to be understood that my broad idea is not limited to a measuring pump equipped with valves of the particular kind herein illustrated, as various other means can be used to permit predetermined quantities of liquid to escape from the container without departing from the spirit of my invention.

Having thus described my invention, what I claim as new and desire to secure by Letters Patent is:

1. A measuring pump, comprising a container that is adapted to hold a liquid, a plurality of tubular measuring valves arranged inside of said container in superimposed relation, and means to selectively raise any one of said valves and all valves above the selected one so as to cause the liquid in the container to escape until the level of the liquid reaches the top edge of the valve directly beneath the selected valve.

2. A measuring pump, comprising a container adapted to hold a liquid, a plurality of tubular measuring valves arranged in said container in superimposed relation with the lower end of one valve fitting in a seat in the valve beneath same, means for holding said valves seated, and a means operable by the operator in charge of the apparatus, that is adapted to be arranged in operative relationship with a selected valve and then actuated to raise said selected valve, and means to selectively raise any one of said valves and all valves above the selected one so as to permit liquid to escape from the container until the level of the liquid drops to the seat of said raised valve.

3. A measuring pump, comprising a container adapted to hold a liquid, a plurality of tubular valves arranged in said container in superimposed relation and separted from each other by horizontal joints, a spring associated with each of said valves for holding it in its closed position, and an operating mechanism common to all of said valves that is adapted to be moved into operative relationship with any one of said valves and then actuated to open the selected valve.

4. A measuring pump, comprising a container adapted to hold a liquid, a plurality of tubular valves arranged in said container in superimposed relation and separated from each other by horizontal joints, a valve rod that projects upwardly through said valves, and a valve lifter connected to said valve rod that is adapted to be moved into operative relationship with a selected valve by turning said rod, said rod being adapted to be thereafter moved so as to cause said lifter to open the selected valve.

5. A measuring pump, comprising a container that is adapted to hold a liquid, a plurality of tubular valves arranged in said container in superimposed relation, a stationary guide tube that projects upwardly through said valves, a valve rod in said tube that is adapted to be turned and also moved vertically, and a member connected to the upper end of said valve rod and arranged between said tube and said valves for opening said valves.

6. A measuring pump, comprising a container that is adapted to hold a liquid, a plurality of tubular valves arranged in said container in superimposed relation, a stationary guide tube that projects upwardly through said valves, a valve rod in said tube that is adapted to be turned and also moved vertically, a valve lifter connected to the upper end of said valve rod and provided with depending side pieces that are arranged between said tube and said valves, and co-operating devices on the valves and on the depending side pieces of said valve lifter that are adapted to be brought into registration with each other by turning the valve rod.

7. A measuring pump, comprising a container that is adapted to be filled with a predetermined quantity of liquid, a plurality of tubular valves arranged inside of said container in superimposed relation, a tube that projects upwardly through said valves, springs for holding said valves seated mounted on said tube between abutments on the valves and abutments on the tube, a valve rod in said tube that can be turned and also moved vertically, a valve lifter connected to the upper end of said valve rod and provided with depending portions arranged between the valves and said tube, and laterally-projecting lugs on the side pieces of said valve lifter that are adapted to co-operate with inwardly-projecting lugs on the valves.

8. A measuring pump, comprising a container that is adapted to be filled with a predetermined quantity of liquid, a plurality of tubular valves arranged in said container in superimposed relation and separated from each other by horizontal joints, a cap on the top valve that prevents the liquid in the container from entering the hollow column formed by said valves, a filling hose that communicates with the lower end of said column, springs for holding said valves seated, and a valve operating mechanism in said column that is adapted to be moved into operative relationship with a selected valve and then actuated to open said valve, whereupon the liquid above the seat of said valve will escape through said column into said filling hose.

9. A measuring pump, comprising a container adapted to receive a liquid, an overflow pipe in said container through which liquid in excess of the maximum quantity of liquid capable of being measured by the pump escapes from the container, a plurality of tubular valves arranged in the container in superimposed relation and separated from each other by horizontal joints, means under control of the operator in charge of the pump for enabling any one of said valves to be opened so as to permit the escape of a predetermined quantity of liquid from the container, a tubular member in said container in which the liquid in the container rises and falls as the level of the liquid varies, and adjustable displacement elements in said tubular member, for the purpose described.

WALTER M. HARKS.